L. BRANDEIS.
Water-Trap.

No. 201,090. Patented March 12, 1878.

Attest:
F. Benjamin
D. A. Welch

Inventor
L. Brandeis
By his attorney
Charles E. Foster

UNITED STATES PATENT OFFICE.

LUDWIG BRANDEIS, OF BROOKLYN, NEW YORK.

IMPROVEMENT IN WATER-TRAPS.

Specification forming part of Letters Patent No. 201,090, dated March 12, 1878; application filed January 18, 1878.

*To all whom it may concern:*

Be it known that I, LUDWIG BRANDEIS, of Brooklyn, Kings county, New York, have invented Improvements in Water-Traps, of which the following is a specification:

The object of my invention is a trap constructed as fully described hereinafter, so as to facilitate its manufacture, permit the interior to be easily reached and inspected, insure the retention of a large body of water, and prevent siphoning.

Figure 1:
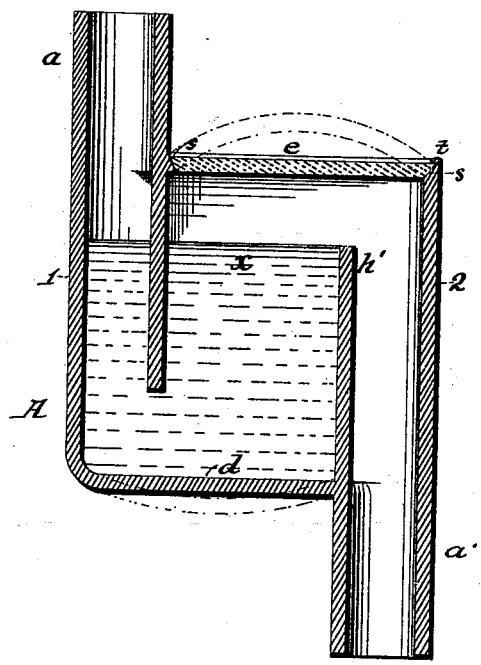
Figure 2:
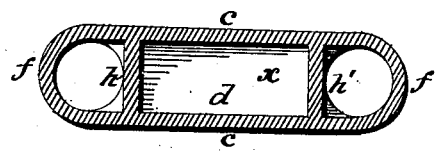

In the accompanying drawing, Figure 1 is a vertical section of my improved trap; and Fig. 2, a transverse section on the line 1 2, Fig. 1.

The body A of the trap has parallel sides $c$ $c$, a flat or rounded bottom, $d$, flat or conical cap or dome $e$, and is rounded at the opposite edges $f f$, which are prolonged to form parts of the parallel tubular branches $a$ $a'$, extending, the one upward and the other downward, from diagonally-opposite corners. The body is divided by transverse parallel partitions $h$ $h'$, the former extending downward to a short distance from the bottom, forming a continuation of the pipe $a$, and the latter forming a continuation of the pipe $a'$, extending to a short distance from the top. The sides $c c$ and partitions $h h'$ constitute a chamber, which, within the same length, will hold a much larger body of water than either of the pipes $a$ $a'$, thereby rendering it impossible for the whole volume to be discharged by any siphon-like action, while a more effectual seal against the passage of gases is obtained.

The said construction also facilitates the manufacture of the traps, each of one continuous piece of metal, as the square portion enables the cores to be more readily withdrawn.

In order to facilitate access to the interior I form the body with bearings or shoulders $s$ for the top $e$, which is confined by bending the edge over the same to form a lip, $t$, or in any other suitable manner, as by clamps, fusing, or otherwise; and where it is desirable to inspect the interior frequently, I make the cap $e$ of glass.

I am aware that it has been proposed to form a trap by extending the tubular branches into the interior, and bending their inner ends toward each other—a construction which results in forming narrow corners and projecting lips, specially liable to afford lodgment for particles, which clog the trap and emit foul gases, while the trap cannot be cast in one piece, owing to the impossibility of withdrawing the cores.

I claim—

1. A trap having branches $a$ $a'$, flat sides $c c$, and enlarged intermediate chamber, with straight flat sides and ends, as set forth.

2. The trap cast with its body A and branches $a$ $a'$ in one piece, with parallel partitions $h$ $h'$ and detachable cap $e$, as set forth.

3. The trap having the chamber $x$ and branches $a$ $a'$, provided at the top with a cap, $e$, of either transparent or opaque material, as and for the purpose set forth.

In testimony whereof I have signed my name to this specification in the presence of two subscribing witnesses.

LUDWIG BRANDEIS.

Witnesses:
 CHAS. J. JOHNSON,
 LEOPOLD BRANDEIS.